United States Patent [19]

Perkins

[11] Patent Number: 4,619,561
[45] Date of Patent: Oct. 28, 1986

[54] METHOD AND APPARATUS FOR CONVEYING PARTICULATE MATTER

[75] Inventor: Jay Perkins, Springville, Utah

[73] Assignee: Pacific States Cast Iron Pipe Co., Provo, Utah

[21] Appl. No.: 767,368

[22] Filed: Aug. 20, 1985

[51] Int. Cl.⁴ .............................................. B65G 53/18
[52] U.S. Cl. .................................................... 406/89
[58] Field of Search ............... 406/86, 92, 95, 191, 406/192, 89; 366/339, 102; 138/108, 37, 42, 178

[56] References Cited

U.S. PATENT DOCUMENTS

| | | | |
|---|---|---|---|
| 1,139,610 | 5/1915 | Wegner | 366/339 X |
| 3,275,196 | 9/1966 | Warczak | 406/92 X |
| 4,220,426 | 9/1980 | Ply | 406/89 |

Primary Examiner—Jeffrey V. Nase
Assistant Examiner—L. E. Williams
Attorney, Agent, or Firm—Thorpe, North & Western

[57] ABSTRACT

A particulate matter conveyor includes an elongate outer tube having an inlet end and an outlet end, an inner tube disposed within the outer tube to extend substantially the length thereof and formed of a resilient helically wound wire spring, with the inner tube having a proximal end disposed generally adjacent to the inlet end of the outer tube for receiving gas supplied under pressure and a distal end disposed generally adjacent to the outlet end of the outer tube, and an opening formed near the inlet end of the outer tube through which particulate matter may be introduced into the interior of the outer tube. Gas supplied to the inner tube escapes from between the coils of the wire spring in a spiral-like fashion to carry particulate matter along the inside of the outer tube to the outlet end therof.

15 Claims, 1 Drawing Figure

METHOD AND APPARATUS FOR CONVEYING PARTICULATE MATTER

BACKGROUND OF THE INVENTION

This invention relates to method and apparatus for conveying particulate matter, especially dust or other fine grained matter, from one location to another.

One system for conveying granular material involves the suspension and movement of the material in a pipe by a high velocity air stream introduced at one end of the pipe. Such a pneumatic system suffers from the problem of pressure drop over the length of the conveyor pipe, especially when the pipe is fairly long. Heavier materials fall out of the air stream, leading to clogging of the conveyor pipe. Another problem of such a system is that the granular material is not efficiently conveyed around sharp bends or turns in the conveyor pipe.

A number of systems have been proposed for solving the pressure drop problem, one of which involves the placement of a porous smaller pipe inside a larger conveyor pipe, supplying air under pressure to the smaller pipe, and then supplying the conveyor pipe with granular material to be conveyed. The air moves inside of the smaller pipe and out the openings spaced therealong to carry the granular material inside the larger pipe. This approach, although more efficient than conventional pneumatic systems, has still encountered difficulties in conveying granular material over long distances and around sharp bends in the conveyor pipe. Also, clogging of the conveyor apparatus is still a problem. Exemplary prior art pneumatic conveyor apparatus is disclosed in U.S. Pat. Nos. 481,672, 3,253,865 and 4,220,426.

SUMMARY OF THE INVENTION

It is an object of the invention to provide a conveyor system for conveying particulate matter without clogging the conveyor apparatus.

It is another object of the invention to provide such a conveyor system which is simple and economical in design and construction.

It is a further object of the invention to provide such a system capable of conveying particulate matter over long distances and around sharp bends.

The above and other objects of the invention are realized in a specific illustrative embodiment which includes an elongate conduit for carrying particulate matter, with the conduit having an input end and a discharge end. An opening is located near the input end of the conduit for receiving particulate matter and another opening is located near the discharge end for discharging particulate matter. A tightly wound coiled wire spring formed into a tube is positioned inside the conduit to extend substantially the length thereof, with the wire spring tube having a proximal end generally coincident with the input end of the conduit, and a distal end generally coincident with the discharge end of the conduit. Gas is supplied to the proximal end of the wire spring tube so that it will travel along the inside thereof toward the distal end and out from between the wire coils. As a result, gas escapes from the wire spring tube in a spiral-like fashion to carry particulate matter toward the discharge end of the conduit.

In accordance with one aspect of the invention, a second elongate conduit is provided, with the second conduit having an origination end and an open discharge end. The second conduit is joined near its origination end to the discharge end of the first conduit to receive particulate matter from the first conduit. A second tightly wound coiled wire spring, formed into a tube, is disposed inside the second conduit to again extend substantially the length thereof. A proximal end of the second wire spring tube is generally coincident with the origination end of the second conduit and the distal end of the second tube is generally coincident with the discharge end of the second conduit. The proximal end of the second wire spring tube is coupled to the gas supply so that gas under pressure travels along the inside of the second wire spring tube and spirals out from between the coils to carry particulate matter along the second conduit. The distal end of the first wire spring tube is disposed adjacent to the side of the proximal end of the second tube so that particulate matter carried inside the first conduit can be delivered to the origination end of the second conduit and then carried inside the second conduit for discharge at the discharge end. In this manner, the particulate matter can be carried around fairly sharp bends in conveyor pipes.

BRIEF DESCRIPTION OF THE DRAWING

The above and other objects, features and advantages of the invention will become apparent from a consideration of the following detailed description presented in connection with the accompanying drawing which shows in schematic, partially fragmented, cross-sectional view a conveyor system made in accordance with the principles of the present invention.

DETAILED DESCRIPTION

Figure 1:
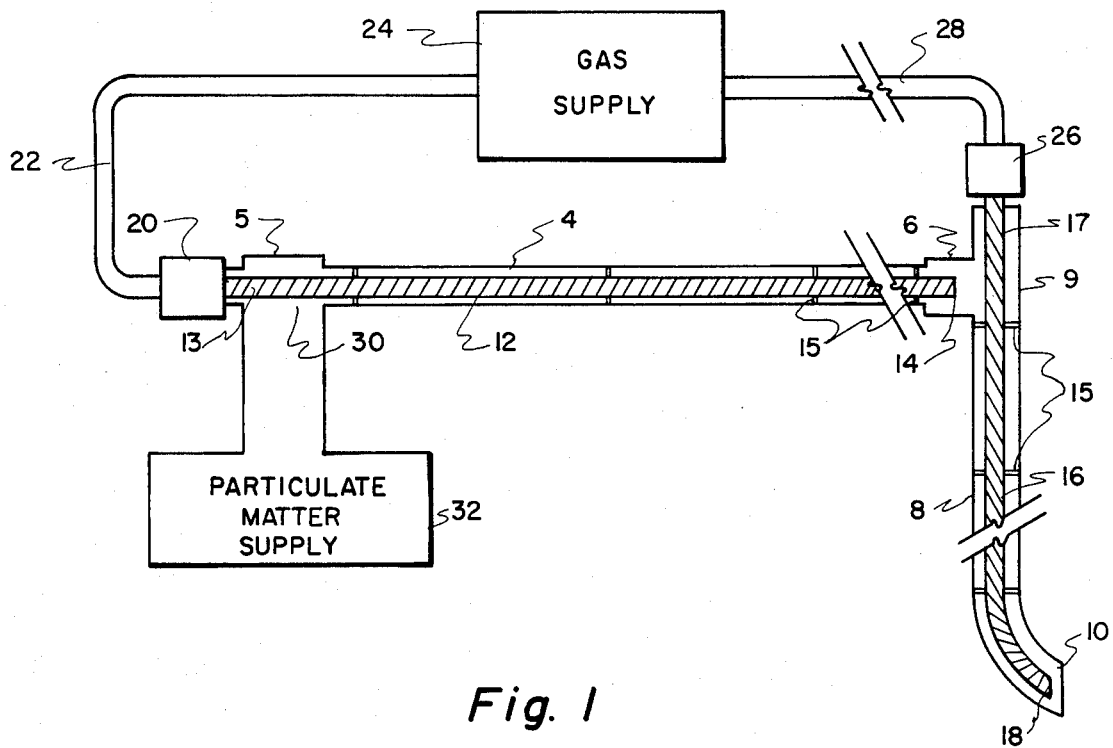

Referring to the drawing, there is shown a schematic view of a pneumatic particulate matter conveying system made in accordance with the present invention. The system includes a pair of elongate conduits 4 and 8 for carrying particulate matter, especially dust or other fine grained material such as silicon powder. The conduit 4 has an input end 5, and a discharge end 6 which is joined to terminate at a generally right angle with respect to conduit 8. Of course, the angle formed between conduit 4 and conduit 8 could be any angle desired by the user which is appropriate to convey the particulate matter in the direction necessary. The discharge end 6 of the conduit 4 is joined to an origination end 9 of the conduit 8. A discharge end 10 of the conduit 8 is open to allow discharge of the particulate matter. Conduits 4 and 8 are generally circular in cross section having an inside diameter of, for example, one inch.

Disposed in the conduits 4 and 8, and held in place by braces 15, are tightly wound coiled wire springs 12 and 16 respectively. Each coiled wire spring is formed in a tubular shape having, for example, an inside diameter of about three-eighths of an inch and an outside diameter of about one-half inch. The loops of the coiled wire springs 12 and 16 are in contact with adjacent loops along the length of the springs, but with enough nonuniformity in the springs to allow air or other gas to escape from between the loops. A conventional coiled wire spring could be utilized.

A proximal end 13 of the spring 12 is positioned to be generally coincident with the input end 5 of the conduit 4 and is joined to a manifold 20 which, in turn, is joined by a pipe or conduit 22 to a gas supply 24. A distal end 14 of the spring 12 is positioned adjacent one side of a proximal end 17 of the spring 16. The distance separating the end of the spring 12 from the side of the spring 16 may illustratively be about one-half inch. The distal end 18 of the spring 16 is positioned generally coincident with the discharge end 10 of the conduit 8, as shown in the drawing. The proximal end 17 of the coil spring 16 is joined to a manifold 26 which, in turn, is coupled by way of a pipe 28 to the gas supply 24.

The gas supply 24 supplies air, nitrogen or other suitable gas under pressure to both manifolds 20 and 26. The gas enters the input end 13 of the spring 12 and the input end 17 of the spring 16 to flow therealong and out from between the coils of the springs into the respective conduits in which the coil springs are located. Coil spring 12 is closed at the distal end 14 so that all of the gas supplied to the spring will escape from between the coils. Because the coils of the spring 12 are helically wound, the gas escapes in a helical, spiraling fashion about the spring to carry particulate matter in a spiral path along the inside the conduit 4. The distal end 18 of the coil spring 16 is pinched but nevertheless open to allow some of the gas to exit from the end as well as also from between the coils of the spring, again in a helical, spiraling fashion. Advantageously, for conduits of about twenty feet in length, the gas supply 24 supplies to the proximal ends of the coil springs gas under a pressure of about fifteen pounds per square inch.

A supply of particulate matter 32, such as silicon dust, is connected through an opening 30 to the interior of the conduit 4 near the input end 5. When gas is supplied to the coil spring 12 and moves therealong within the conduit 4, particulate matter is drawn up and carried from the supply 32 towards the conduit 8. An alternative for introducing particulate matter into the conduit 4 would be simply to extend the coil spring 12 into a container holding the particulate matter so that the coil spring essentially is surrounded by the particulate matter to be delivered.

As the particulate matter reaches the joint between the conduits 4 and 8, the gas supplied to the coil spring 12 continues movement of the particulate matter down the conduit 8 and ultimately out the discharge end 10 thereof.

Two sections of conveying pipes or conduits are shown in the drawing, but it should be understood that numerous sections could be joined together to carry particulate matter on whatever route was desired. Also, a single conduit could be utilized with more gradual bends and turns, with the interior coil spring also bending and curving in conjunction with the bending and curving of the conduit, such as shown for the distal end 18 of the spring 16. The coil spring is resilient and flexible both to allow such bending and curving and also to allow some flexure for escape of gas from between the coil loops.

In the manner described, particulate matter, especially fine dust such as silicon powder, can be carried over long distances from a particulate matter supply 32 and delivered to a destination towards which the conduit 8 is aimed. Because the gas which moves the particulate matter is carried in coil springs 12 and 16, and since the particulate matter does not enter the interior of the springs, the springs will not become clogged. Clogging is also prevented from occurring in the conduits 4 and 8 because of the spiral like direction of travel of the gas as it escapes from between the loops of the coil springs.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangments.

What is claimed is:

1. Apparatus for conveying particulate matter comprising an elongate conduit for carrying particulate matter and having an input end and a discharge end, an opening at or near the input end of the conduit for introducing particulate matter into the conduit, and an opening at or near the discharge end of the conduit for discharging particulate matter, a tightly wound coiled wire spring formed into a tube and disposed inside the conduit to extend substantially the length of the conduit, said wire spring having a proximal end generally coincident with the input end of the conduit and a distal end generally coincident with the discharge end of the conduit, and means for supplying gas under pressure to the proximal end of the coiled wire spring so that the gas travels along the inside of wire spring toward the distal end and out between the wire coils in a spiral-like fashion to carry particulate matter toward the discharge end of the conduit.

2. Apparatus as in claim 1 wherein the wire spring is flexible and resilient.

3. Apparatus as in claim 1 wherein the gas supplying means supplies nitrogen gas.

4. Apparatus as in claim 1 wherein gas is supplied to the coiled wire spring under a pressure of between about 15 and 30 p.s.i.

5. Apparatus as in claim 1 wherein the conduit and tube formed by the coiled spring have generally circular cross-sections and wherein the inside diameter of the tube is about three-eighths of an inch and the outside diameter is about one-half inch, and wherein the inside diameter of the conduit is about one inch.

6. Apparatus as in claim 1 further including a second elongate conduit having an origination end and an open discharge end, said second conduit being joined near its origination end to the discharge end of the first-mentioned conduit to receive particulate matter therefrom, a second tightly wound coiled wire spring formed into a tube and disposed inside the second conduit to extend substantially the length thereof, said second wire spring having a proximal end generally coincident with the origination end of the second conduit and a distal end generally coincident with the discharge end of the second conduit, and means coupling the proximal end of the second wire spring to the gas supplying means to carry gas from the gas supplying means to the second wire spring.

7. Apparatus as in claim 6 wherein the distal end of the first-mentioned wire spring is closed, and wherein the distal end of the second wire spring is open.

8. Apparatus as in claim 7 wherein the distal end of the first-mentioned wire spring is disposed adjacent the side of the proximal end of the second wire spring.

9. Apparatus as in claim 8 wherein the distal end of the first-mentioned wire spring is spaced about one-half inch from the side of the proximal end of the second wire spring.

10. A particulate matter conveyor comprising
a first elongate, outer tube having an inlet end and an outlet end,
a first elongate, inner tube disposed within the outer tube to extend substantially the length thereof and formed of a resilient helically wound wire in which the helical loops are in contact with adjacent helical loops along the length of the tube, said inner tube having a proximal end disposed generally adjacent to the inlet end of the outer tube for receiving gas supplied under pressure and a distal end disposed generally adjacent to the outlet end of the outer tube, and
an opening formed near the inlet end of the outer tube through which particulate matter may be introduced into the interior of the outer tube.

11. A conveyor as in claim 10 further including
a second elongate, outer tube having an inlet end and an outlet end, said second outer tube being joined near its inlet end to the outlet end of the first outer tube to receive particulate matter therefrom, and
a second elongate inner tube disposed within the second outer tube to extend substantially the length thereof and formed of a resilient helically wound wire in which the helical loops are in contact with adjacent helical loops along the length of the second inner tube, said second inner tube having a proximal end disposed generally adjacent to the inlet end of the second outer tube for receiving gas supplied under pressure, and a distal end disposed generally adjacent to the outlet end of the second outer tube.

12. A conveyor as in claim 11 wherein the distal end of the first inner tube is closed, and wherein the distal end of the second inner tube is open.

13. A conveyor as in claim 11 wherein the distal end of the fist inner tube is disposed adjacent the side of the proximal end of the second inner tube.

14. A conveyor as in claim 13 wherien the distal end of the first inner tube is spaced from the side of the proximal end of the second inner tube by about one-half inch.

15. A conveyor as in claim 10 wherein the ratio of inside volume of the inner tube to the inside volume of the outer tube is about one to four.

* * * * *